United States Patent [19]

Oslin et al.

[11] Patent Number: 5,224,812
[45] Date of Patent: Jul. 6, 1993

[54] TRANSPORT CART

[75] Inventors: G. Robert Oslin, Chicago; Lawrence R. Melnick, Skokie, both of Ill.

[73] Assignee: Delaware Capital Formation, Inc., Wilmington, Del.

[21] Appl. No.: 748,678

[22] Filed: Aug. 22, 1991

[51] Int. Cl.⁵ .............................................. B65G 1/06
[52] U.S. Cl. ................................... 414/331; 414/401; 414/498
[58] Field of Search ............... 414/267, 277, 279, 331, 414/389, 401, 608, 498; 410/4, 7, 19, 22, 30, 67, 6, 9, 25; 104/48

[56] References Cited

U.S. PATENT DOCUMENTS

| | | |
|---|---|---|
| 1,410,466 | 3/1922 | Gantvoort . |
| 1,599,227 | 9/1926 | Gantvoort ............................. 414/331 |
| 1,826,885 | 4/1931 | Hoppe et al. . |
| 2,127,278 | 8/1938 | Welch ............................. 414/389 X |
| 2,883,253 | 4/1959 | Litman . |
| 3,021,795 | 2/1962 | Hayba et al. ........................... 104/48 |
| 3,261,484 | 2/1964 | Nilsson . |
| 3,261,650 | 2/1964 | Stromqvist . |
| 3,341,037 | 9/1965 | Guilbert, Jr. . |
| 3,526,325 | 9/1970 | Temple ............................. 414/331 |
| 3,630,439 | 12/1971 | Cook . |
| 3,692,195 | 9/1972 | Shirey et al. .................... 414/331 X |
| 3,695,464 | 10/1972 | Kaji ................................ 414/277 |
| 3,732,992 | 5/1973 | Busam .............................. 414/267 |
| 3,743,115 | 7/1973 | Saul, Jr. et al. ................ 414/267 X |
| 3,869,052 | 3/1975 | Leahy . |
| 4,472,099 | 9/1984 | Hahn et al. ......................... 414/401 |
| 4,634,333 | 1/1987 | Butterly, Jr. et al. .............. 414/331 |
| 4,662,810 | 5/1987 | Nobuhara ....................... 414/401 X |
| 4,697,974 | 10/1987 | Eltoukhy ......................... 414/498 X |
| 5,072,960 | 12/1991 | Sperko ........................... 414/401 X |

Primary Examiner—Michael S. Huppert
Assistant Examiner—James Keenan
Attorney, Agent, or Firm—Welsh & Katz, Ltd.

[57] ABSTRACT

A cart for transporting at least one dolly to facilitate off-loading and on-loading of the dolly into and from a compartment having an entry edge. The cart includes a wheeled frame having upper and lower pairs of guide tracks extending longitudinally of the frame and adapted to support a pair of dollies. The cart carries a locking latch for releasably securing the cart in spaced relation to an oven cabinet or the like, and a bridge member adjacent the forward end of each pair of guide tracks for movement between a retracted position and an extended position bridging the space between the forward ends of the corresponding guide tracks and the entry edge of an adjacent compartment to facilitate off-loading and on-loading of a dolly into and from the compartment. A dolly retainer member is associated with each pair of guide tracks to releasably retain a dolly longitudinally on the corresponding guide tracks during transport.

14 Claims, 2 Drawing Sheets

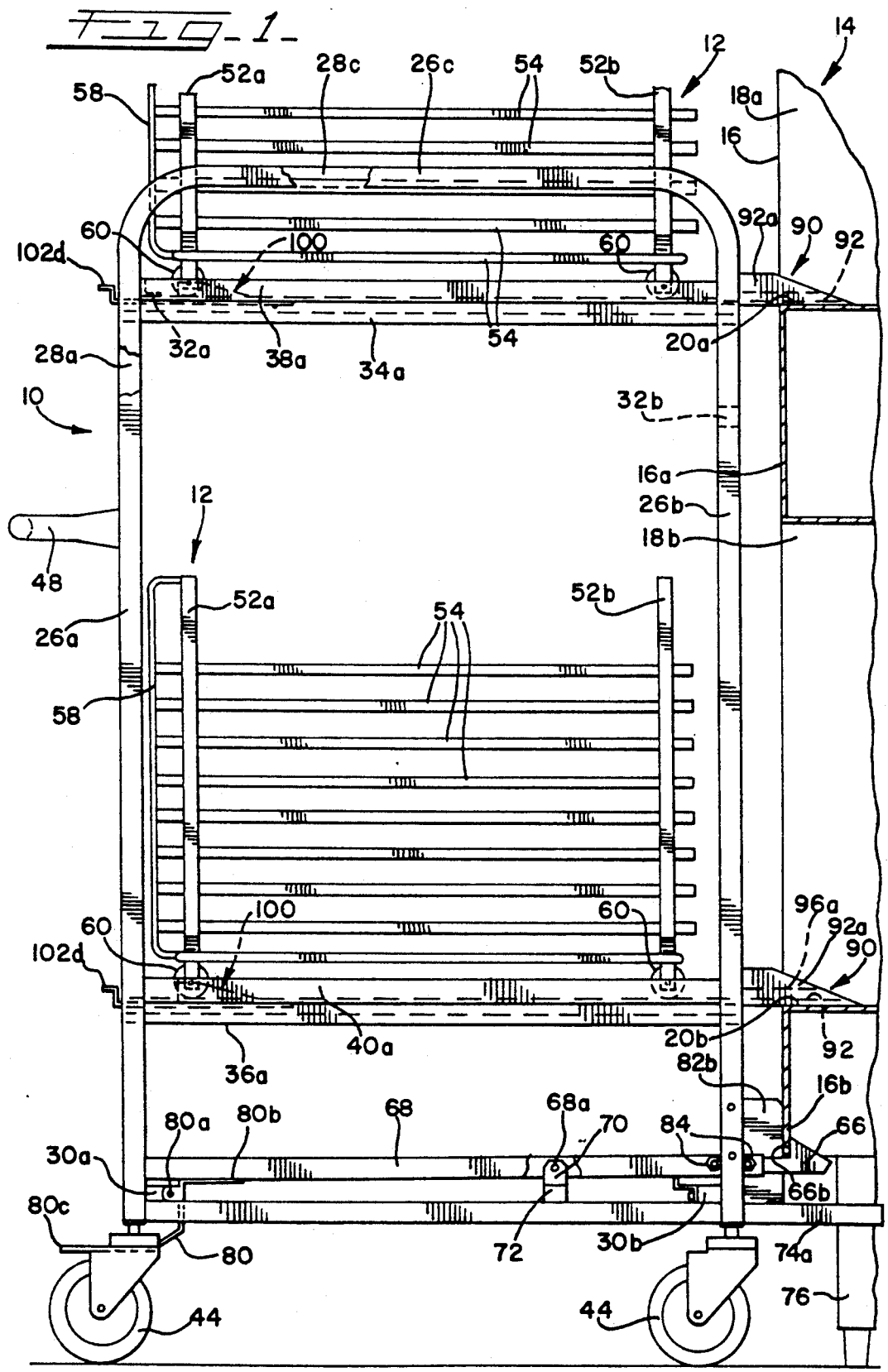

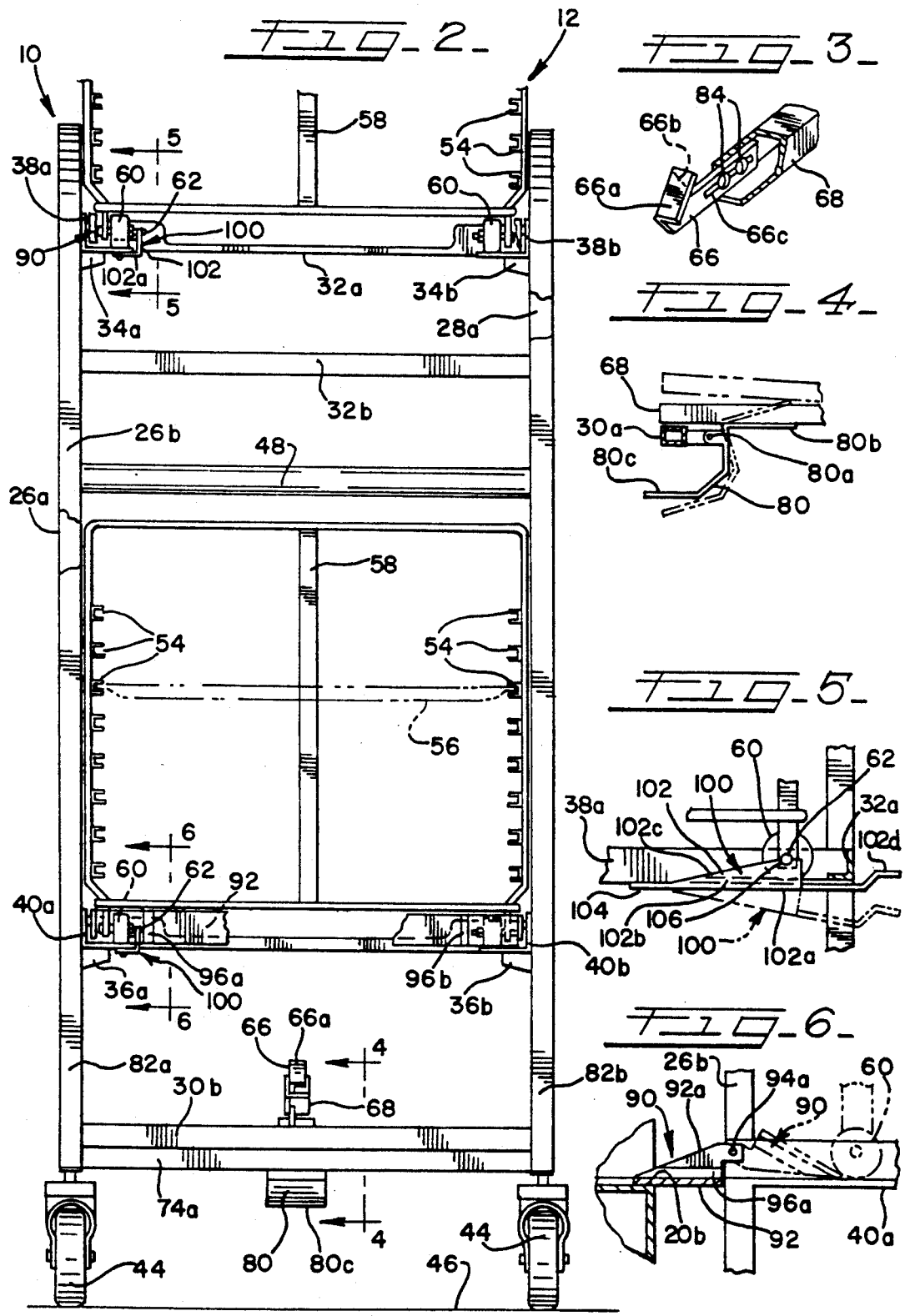

TRANSPORT CART

BACKGROUND OF THE INVENTION

The present invention relates generally to transport carts, and more particularly to a novel cart for transporting dollies and the like for off-loading and on-loading of the dollies into and from a compartment such as a cooking compartment in an oven.

It is a common practice in commercial processing of food products which require baking or the like, to prepare the food products for baking at a food preparation station remote from the cooking ovens. Depending upon the type and size of food products being prepared, the food products are generally placed on trays which are then inserted into an oven baking compartment for baking. After baking, the trays of food products may be transferred to another processing station or, for example, placed in a refrigerator compartment preparatory to further processing. To improve efficiency, a plurality of trays containing food products prepared at the remote food preparation station are frequently supported on a dolly which may be inserted into an oven cooking compartment with trays loaded thereon for baking the food products. Because of the weight of a dolly when loaded with a plurality of food trays, the dolly may be supported on a transport cart for transporting the dolly to an oven or refrigerator or the like where the dolly and associated trays are off-loaded from the cart into the oven or refrigerator compartment, and subsequently loaded back onto the cart for transport to another food processing station. See, for example, U.S. Pat. Nos. 2,883,253, 3,261,484, 3,261,650 and 3,869,052.

Commercial ovens frequently are made as vertical double ovens or may be supported in vertically stacked relation, with each oven having a door hinged about a vertical axis to enable access to the corresponding baking or cooking compartment. Commercial refrigerators may also be made with upper and lower refrigerator compartments having corresponding hinged access doors. A significant problem with known transport carts, and particularly carts adapted to support a plurality of tray-carrying dollies for transport to and from double stacked ovens or refrigerators having upper and lower hinged access doors, is that the carts require both of the upper and lower doors to be open even though access to only one of the compartments is desired. Further, the known transport carts of the type described do not operate effectively with ovens or the like where a space exists between the cart and the entry edge of the oven compartment when the cart is positioned for off-loading or on-loading dollies into and from the oven compartment. The present invention addresses these problems by providing a novel transport cart for transporting one or more tray-carrying dollies, and which readily enables off-loading of a dolly across a space into an oven or refrigerator compartment or the like when the cart is in latched confronting relation therewith.

SUMMARY OF THE INVENTION

Accordingly, a general object of the present invention is to provide a novel transport cart which is particularly adapted for transporting and off-loading dollies into either compartment of a double-compartment appliance or the like having hinged doors for accessing either compartment.

A more particular object of the present invention is to provide a transport cart for transporting one or more tray-carrying dollies to an oven or the like having vertically stacked compartments with corresponding hinged access doors, and wherein the cart enables off-loading of a dolly into, or on-loading of a dolly from, either the upper or lower compartment while the door on the other compartment remains closed.

Another object of the present invention is to provide a novel transport cart for transporting tray-carrying dollies to an oven or the like having a hinged door for accessing a compartment having an entry edge, and wherein the cart has guide tracks extending generally longitudinally thereof to receive and support a dolly at generally the same elevation as the entry edge of the compartment, and has a bridge member carried on the forward end of the cart adjacent the guide tracks for movement between a retracted position operative to retain a dolly on the guide tracks and an extended position adapted to bridge the space between the forward end of the guide tracks and the entry edge of the compartment so as to facilitate off-loading and on-loading of a dolly when the cart is in confronting relation with the compartment.

A feature of the transport cart in accordance with the present invention lies in providing a locking latch and locating bumpers on the cart which cooperate to releasably latch the cart in spaced relation to the cabinet of an oven or the like having upper and lower compartments with corresponding hinged doors, and wherein the cart carries transverse bridge members adjacent the forward ends of the upper and lower guide tracks to bridge the space between the guide tracks and the cabinet for selective off-loading of a dolly into a compartment while the door to the other compartment remains in closed position, or for off-loading dollies from both the upper and lower guide tracks with both compartment doors open.

Another feature of the transport cart in accordance with the invention lies in the provision of a dolly retaining member adjacent the rearward end of each pair of dolly guide tracks and actuated by entry of a dolly onto the corresponding guide tracks to releasably maintain the dolly in fixed longitudinal relation on the cart.

Further objects, features and advantages of the present invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is a side elevational view of a transport cart constructed in accordance with the present invention having a pair of tray-carrying dollies supported thereon and being illustrated in latched relation with a cabinet having upper and lower compartments;

FIG. 2 is a front elevational view of the transport cart illustrated in FIG. 1 but with the transverse bridge members partially broken away for purposes of clarity;

FIG. 3 is a fragmentary perspective view of the locking latch employed with the transport cart of FIGS. 1 and 2;

FIG. 4 is a fragmentary vertical sectional view taken substantially along line 4—4 of FIG. 2 and illustrating the foot release pedal for the locking latch;

FIG. 5 is a fragmentary vertical sectional view taken substantially along line 5—5 of FIG. 2 and illustrating a dolly retaining member in operative association with a dolly; and FIG. 6 is a fragmentary vertical sectional view illustrating a bridge member bridging a space between the forward ends of a pair of guide tracks and the entry edge of a compartment, the bridge member being shown in a retracted position in phantom.

DETAILED DESCRIPTION

Referring now to the drawings, and in particular to FIGS. 1 and 2, a transport cart constructed in accordance with the present invention is indicated generally at 10. The transport cart 10 is particularly adapted for transporting a plurality of tray-carrying dollies, two of which are indicated generally at 12, for off-loading and subsequent on-loading of one or more of the dollies into and from a chamber or compartment. In the illustrated embodiment, the transport cart 10 is shown in latched relation to an appliance such as a commercial oven or the like, a fragmentary portion of which is indicated generally at 14 in FIG. 1. As will become apparent, the features of the transport cart 10 also make it particularly adapted for conveying tray-carrying dollies or the like to other appliances, such as a refrigerator having upper and lower refrigerator compartments.

The oven 14 may comprise a pair of vertically stacked ovens or a generally unitary oven of conventional design, having a pair of oven compartments or chambers accessible through vertically hinged doors (not shown). In the illustrated embodiment, the oven 14 has an external cabinet 16 having a front wall 16a and defining upper and lower compartments 18a and 18b, respectively, accessible through associated hinged doors (not shown) which open about vertical hinge axes.

Each of the oven compartments 18a and 18b has a horizontal entry edge, indicated at 20a and 20b, respectively, adjacent the forward wall 16a. A lower free edge 16b of the forward cabinet wall 16a facilitates releasable latching of the cart 10 to the oven 14 when the forward end of the cart is in confronting relation to the front wall 16a of the oven.

The transport cart 10 includes frame means 24 in the form of a generally open framework having a pair of laterally spaced inverted U-shaped side frame members 26 and 28. Each of the U-shaped frame members 26 and 28 defines a pair of upstanding generally parallel legs 26a,b and 28a,b, respectively. A pair of transverse frame members 30a and 30b are fixed to and between the lower ends of the corresponding rear legs 26a, 28a and front legs 26b, 28b. A pair of transverse frame members 32a and 32b are fixed to and between the upper ends of the legs 26a, 28a and 26b, 28b and cooperate with the transverse frame members 30a and 30b to maintain the frame members 26 and 28 in laterally spaced parallel relation.

Upper and lower pairs of longitudinally extending rail or track support members 34a,b and 36a,b are secured at their opposite ends to the corresponding upstanding frame legs 26a,b and 28a,b so that the track support members of each pair lie in horizontal coplanar parallel relation with each other. The track support members 34a,b and 36a,b support elongated rail or guide track members 38a,b and 40a,b, respectively, which are generally L-shaped in transverse cross section and extend longitudinally of the track support members. The track members 38a,b and 40a,b define track means having forward ends terminating at the forward end of the cart 10 defined by the upstanding frame legs 26b and 28b.

To facilitate maneuverability of the transport cart 10, each of the upstanding frame legs 26a,b and 28a,b has a wheel or caster 44 mounted on its lower end to enable movement of the transport cart along a floor or support surface 46 on which the oven 14 is supported. A transverse handle 48 is mounted between the rear upstanding frame members 26a and 28a to facilitate manual pushing, pulling and turning of the transport cart. If desired, one or more of the wheels or casters 24 may have releasable locking means associated therewith to enable selective locking of the transport cart in place.

The upper and lower pairs of guide track members 38a,b and 40a,b are spaced, respectively, from the floor surface 46 so that the forward ends of the track members are generally horizontally aligned with the entry edges 20a and 20b of the oven compartments 18a and 18b when the forward end of the cart 10 is in confronting relation with the front wall 16a of oven 14. Each pair of track members 38a,b and 40a,b serves to receive and support a dolly 12 so as to allow off-loading of one or both of the dollies into the corresponding upper and lower oven compartments, and vice versa. In the illustrated embodiment, each of the dollies has forward and rearward frame members 52a and 52b which are of generally inverted U-shape and are maintained in parallel spaced relation by laterally opposed pairs of tray support channels 54. Each pair of channels 54 defines a horizontal support rack to receive a tray such as indicated in phantom at 56 in FIG. 2. The tray support racks are open at their forward ends to facilitate loading and unloading of trays 56 onto and from the dollies. An upstanding tray stop 58 is mounted at the rear of each dolly to limit inward movement of trays 56.

The dollies 12 preferably have wheels 60 rotatable about respective horizontal axles 62 which are fixed to the lower ends of the dolly frame members 52a and 52b in axially aligned mutually facing pairs, as illustrated in FIG. 2. In this manner, the dollies 12 may be readily wheeled longitudinally onto and along the respective rail or guide track members 38a,b and 40a,b.

To maintain the transport cart 10 in fixed relation to the oven cabinet 16 when the forward end of the transport cart is in confronting relation with the front wall 16a of the oven cabinet, the transport cart carries releasable latching means in the form of a locking latch 66. The locking latch 66 is carried on the forward end of an elongated latch lever 68 which extends longitudinally of the transport cart generally centrally between the frame members 26 and 28. The latch lever 68 is pivoted at 68a to a pivot bracket 70 fixed centrally on a transverse support member 72. The opposite ends of support member 72 are fixed to a horizontal generally U-shaped frame member 74 which is secured to the lower ends of the upstanding frame legs 26a,b and 28a,b and extends forwardly from the forward frame legs 26b and 28b, as indicated at 74a in FIG. 1. In the illustrated embodiment, the oven 14 has front support legs, one of which is indicated at 76, which are spaced apart sufficiently to receive the forward extension 74a of frame member 74 therebetween and effect desired lateral orientation of the transport cart relative to the oven cabinet 16.

The pivot axis 68a of latch lever 68 is positioned so that the rearward end of the latch lever is biased downwardly by gravity into engagement with a foot operated release or trip pedal 80. The release pedal 80 is pivoted at 80a centrally to the transverse frame member 30a and has an arm portion 80b underlying the rear end of latch lever 68. A rearwardly extending foot engagable portion 80c of the release pedal is adapted to be depressed by an operator's foot for pivoting the rear end of the latch lever 68 upwardly and thereby effecting a corresponding lowering of the locking latch 66.

As illustrated in FIG. 3, the locking latch 66 has an inclined cam or ramp surface 66a positioned to engage the lower edge 16b of the oven cabinet wall 16a as the cart is moved into confronting relation with the front wall of the oven cabinet. The ramp surface 66a cams the locking latch 66 downwardly until a detente surface 66b receives the lower edge of the cabinet wall in latching relation. A pair of resilient bumpers 82a and 82b are mounted on the lower ends of the cart frame legs 26b and 28b so as to engage the cabinet front wall 16a and cooperate with the locking latch 66 to maintain the transport cart in releasable fixed relation to the oven. To accommodate different cabinet configurations, the locking latch 66 has an elongated longitudinal slot 66c which receives mounting bolts 84 for enabling longitudinal adjustment of the locking latch on the forward end of latch lever 68.

With the transport cart 10 releasably latched to the front wall 16a of the oven 14, as illustrated in FIG. 1, a gap or space will generally exist between the forward ends of the dolly guide track members 38a,b and 40a,b and the entry edges 20a and 20b of the corresponding oven compartments 18a and 18b. To facilitate off-loading of a dolly 12 from either or both of the upper and lower pairs of guide tracks 38a,b and 40a,b across such a gap or space and into the corresponding oven compartment, bridge means in the form of a bridge member 90 is pivotally mounted on the cart frame 24 adjacent the forward end of each pair of guide tracks. Each bridge member 90 includes a bridge plate 92 having right-angle end flanges 92a and 92b which are pivotally mounted to the respective frame legs 26b and 28b through axially aligned stub shafts 94a and 94b fixed to the frame legs. Each bridge member 90 is pivotally moveable between a retracted position, as shown in phantom in FIG. 6, wherein its bridge plate 92 serves as a stop to prevent longitudinal off-loading movement of the corresponding dolly 12, and a forward extended position, as shown in solid lines in FIG. 6, wherein the free edge of the bridge plate 92 is supported on the corresponding entry edge 20a or 20b of the corresponding oven compartment 18a or 18b. With a bridge member 90 in its forward extended position, a dolly 12 supported on the corresponding guide tracks 38a,b or 40a,b may be readily moved across the bridge plate 92 into the corresponding oven compartment. To assist in guiding the wheels 60 of a dolly during off-loading from the transport cart 10, each bridge plate 92 preferably has a pair of laterally spaced upstanding flanges 96a and 96b fixed thereon which are spaced apart a distance sufficient to guide the cart wheels onto corresponding track members (not shown) within the oven compartments 18a and 18b. Similarly, the flanges 96a and 96b assist in guiding a dolly 12 from an oven compartment 18a or 18b onto the corresponding pair of guide tracks 38a,b or 40a,b on the transport cart 10, after which the bridge member is pivoted to its retracted position to maintain the dolly on the transport cart. The bridge members 90 accommodate variations in height between the entry edges, such as 20a and 20b, of oven compartments in different ovens and the height of the transport cart track members 38a,b and 40a,b.

To positively retain a dolly 12 longitudinally on either or both of the upper and lower pairs of track members 38a,b and 40a,b, dolly retaining means 100 are mounted on the transport cart frame 24 adjacent the rearward end of each pair of track member. Referring to FIG. 5, taken in conjunction with FIGS. 1 and 2, each of the dolly retaining means 100 includes a retainer member 102 which is preferably made of a suitable metallic or plastic material and has a plate portion 102a secured to the lower surface of a corresponding track member, such as 38a, by a screw fastener 104. Each retainer member 102 has an upstanding right-angle flange 102b having an upwardly inclined ramp or cam edge surface 102c thereon adapted to be engaged by the axle 62 of a corresponding dolly wheel 60 when the dolly is moved along the corresponding track member 38. The plate portion 102a of the retainer member 102 is sufficiently flexible so that progressive engagement of the axle 62 along the ramp surface 102c depresses the retainer member. A recess or detent 106 is formed adjacent the upper end of the ramp surface 102c to receive the dolly wheel axle 62 when the dolly is moved to its desired transport position on the transport cart, thereby releasably retaining the dolly in fixed longitudinal relation on the corresponding guide track members 38a,b or 40a,b. When it is desired to off-load a dolly from the transport cart, depressing a rear upturned end 102d of the retainer member 102 releases the dolly wheel axle 62 from the recess 106 to allow longitudinal movement of the dolly. In this manner, loading a dolly 12 onto the transport cart effects automatic engagement of the dolly with the retainer member recess 106 to prevent longitudinal movement of a loaded dolly in the event an operator fails to retract the corresponding bridge member 90.

Having thus described a preferred embodiment of a transport cart for use in transporting tray-carrying dollies to and from an oven or other processing or storage apparatus, such as a refrigerator or the like, having hinged doors providing access to processing or storage compartments, it will be appreciated that the transport cart 10 is adapted for latching relation with the cabinet of the oven or other apparatus having compartments into which the dollies are to be inserted. With one door of a double stacked oven, for example, being in open position, and with the cart latched in confronting relation to the oven cabinet, the corresponding bridge member 90 on the transport cart may be pivoted to bridge the gap between the forward end of the transport cart and the entry edge of the adjacent cooking compartment. Thereafter, depressing the dolly retainer member 102 on the corresponding cart guide tracks enables off-loading of the dolly into the oven compartment. By latching the transport cart in generally predetermined outwardly spaced relation from the front wall of the oven cabinet through the spacing bumpers 82a,b, a dolly may be off-loaded from either the upper or lower guide tracks 38a,b or 40a,b into a corresponding open compartment in the oven, while the door to the other oven compartment remains closed. In reverse order, a dolly may be on-loaded onto the upper or lower guide tracks on the cart from a corresponding oven compartment, with the dolly effecting automatic retention by the corresponding retainer member 102. The latch 66 may then be released from the oven cabinet by depressing the foot release pedal 80 to enable transport of the cart and associated dolly to another processing station.

While a preferred embodiment of the present invention has been illustrated and described, it will be understood that changes and modifications may be made therein without departing from the invention in its broader aspects. Various features of the invention are defined in the following claims.

What is claimed is:

1. A cart for transporting at least one dolly to facilitate off-loading and on-loading of the dolly into and from a compartment having an entry edge, said cart comprising, in combination, a frame having means enabling movement of the frame along a support surface, said frame defining forward and rearward ends and having track means extending longitudinally of the frame and adapted to support a dolly, said track means including at least one pair of laterally spaced track members positioned for substantially horizontal alignment with the entry edge of the compartment when the cart is in confronting but spaced relation with the compartment, latch means carried by said frame for releasably latching the cart to the compartment in response to positioning of the cart in predetermined confronting relation with the compartment, and bridge means carried by said cart frame adjacent the forward end of said track means, said bridge means including a single bridge plate extending laterally of said track members and moveable relative to said frame about a substantially horizontal axis between a retracted position operative to overlie said track members and prevent movement of a dolly on the track members in an off-loading direction, and an extended position generally coplanar with said track members to bridge between the forward ends of said track members and the entry edge of the compartment so as to facilitate off-loading and on-loading of the dolly from the track members into and from the compartment.

2. A cart defined in claim 1 including bumper means carried by said frame for engaging a surface adjacent said compartment when said cart is in confronting relation with the compartment, said latch means including a locking latch carried by said frame for releasably latching said frame to a cabinet defining said compartment when the forward end of the frame is in said predetermined confronting relation with the cabinet.

3. A cart as defined in claim 2 wherein said locking latch is carried on a forward end of a longitudinally extending latch lever, said locking-latch being operative to engage an edge of the cabinet in latching relation therewith when the cart is in confronting relation with the cabinet with said bumper means engaging a surface adjacent the compartment, and release means carried by said frame in operative association with said latch level so as to enable manual release of said locking latch from the cabinet.

4. A cart as defined in claim 3 wherein said locking latch is longitudinally adjustable on said latch lever.

5. A cart as defined in claim 4 wherein said latch lever is biased by gravity to a position urging said locking latch into latching relation with the cabinet when the cart is in confronting relation therewith, said release means including a foot actuated release pedal enabling an operator to release said locking latch from the cabinet by foot depression of said release pedal.

6. A cart as defined in claim 1 wherein said frame comprises a generally open framework having four generally vertically disposed corner frame members, each of said corner frame members having a wheel mounted at its lower end to facilitate traverse of the frame over a support surface, said track means including upper and lower pairs of laterally spaced substantially parallel guide track members extending longitudinally of the frame and having forward ends adapted for substantially horizontal alignment with compartments of an appliance when the forward end of the cart is in confronting relation therewith, said bridge means including one of said bridge plates extending between each pair of said guide track members.

7. A cart as defined in claim 1 wherein said laterally spaced guide track members extend longitudinally of the frame and are adapted to receive a wheeled dolly thereon, and including dolly retaining means mounted on the rearward end of at least one of said guide track members for engagement by a dolly when fully disposed on said guide track members so as to releasably retain the dolly in fixed longitudinal relation on the guide track members.

8. A cart as defined in claim 7 wherein said dolly retaining means includes at least one retainer member adapted to be engaged by a dolly wheel axle when mounted on said guide track members so as to retain the dolly in fixed relation on the guide track members, said retainer member being moveable to release the axle and enable off-loading of the dolly from the guide track members.

9. A cart as defined in claim 1 including dolly retaining means mounted on said frame adjacent said rearward end of said track means, said dolly retaining means being actuated by a dolly when fully disposed on said track members so as to releasably retain the dolly in substantially fixed longitudinal relation on said track members.

10. A cart as defined in claim 9 wherein the dolly has a frame supported by wheels adapted to traverse said track means on said cart frame, said dolly retaining means including a retainer member supported by said tracks means and adapted to interlock with the dolly in a manner to releasably retain the dolly on the cart.

11. A cart as defined in claim 10 wherein said retainer member has a ramp surface and detent adapted to be engaged by a dolly being loaded onto said track means so as to effect releasable interlocking of the dolly with the retainer member, said retainer member being adapted for pivotal movement to release the dolly for off-loading.

12. A cart for transporting at least one dolly to facilitate off-loading and on-loading of the dolly into and from a compartment having an entry edge, said cart comprising, in combination, a frame having means enabling movement of the frame along a support surface, said frame defining forward and rearward ends and having at least one pair of laterally spaced guide tracks extending longitudinally of the frame and adapted to receive a wheeled dolly thereon, said guide tracks having forward and rearward ends and being positioned for substantially horizontal alignment with the entry edge of the compartment when the cart is in confronting relation with the compartment, latch means operatively associated with said frame for releasably latching the cart in confronting relation with the compartment, bridge means carried by said frame adjacent the forward ends of said guide track, said bridge means including a bridge plate moveable relative to said frame between a retracted position operative to limit movement of a dolly on the guide tracks, and an extended position adapted to bridge between the forward end of said guide tracks and the entry edge of the compartment so as to facilitate off-loading and on-loading of a dolly from the cart into and from the compartment, and dolly retaining means including at least one retainer member operatively associated with the rearward end of at least one of said guide tracks and having a ramp surface adapted to be engaged by a dolly wheel axle during loading of a dolly onto said guide tracks, said ramp surface having a locking recess to receive the axle so as to releasably retain a dolly in fixed longitudinal relation on the guide tracks, said retainer member being movable to release the axle and enable off-loading of the dolly.

13. A cart as defined in claim 12 wherein said retainer member has an operating arm thereon enabling manual release of the dolly axle from said retainer member.

14. A cart for transporting at least one dolly to facilitate off-loading an on-loading of the dolly into and from a compartment having an entry edge, said cart comprising, in combination, a frame comprising a generally open framework having four generally vertically disposed corner frame members, each of said corner frame members having a wheel means mounted at its lower end to facilitate traverse of the frame over a support surface, said frame defining forward and rearward ends and having track means including upper and lower pairs of laterally spaced substantially parallel guide tracks extending longitudinally of the frame and adapted to support a dolly, said guide tracks having forward ends adapted for substantially horizontal alignment with compartments of an appliance when the forward end of the cart is in confronting but spaced relation with the compartments, latch means operatively associated with said frame for releasably latching the cart in confronting relation with the compartments, and bridge means including a bridge plate pivotally supported by said frame and extending substantially between the corner frame members adjacent the forward ends of each pair of guide tracks, each of said bridge plates being supported adjacent one end for movement relative to said frame between a retraced position operative to prevent movement of a dolly on the corresponding guide tracks in an off-loading direction, and an extended position adapted to bridge between the forward ends of the corresponding guide tracks and the entry edges of the compartments so as to facilitate off-loading and on-loading of dollies from the cart into an from the compartments, each of said bridge plates having guide means thereon adapted for alignment with the forward ends of the corresponding pair of guide tracks when the bridge plate is in an extended position relative to said frame so as to guide a dolly from the corresponding guide tracks into a compartment when the cart is in confronting relation therewith.

* * * * *

UNITED STATES PATENT AND TRADEMARK OFFICE
CERTIFICATE OF CORRECTION

PATENT NO. : 5,224,812
DATED : July 6, 1993
INVENTOR(S) : Oslin et al.

It is certified that error appears in the above-identified patent and that said Letters Patent is hereby corrected as shown below:

Column 7, line 50, "level" should read --lever--;
Column 7, line 55, "in claim 4" should read --in claim 3--;
Column 10, line 18, change "an" to --and--.

Signed and Sealed this

First Day of March, 1994

BRUCE LEHMAN

*Attest:*

*Attesting Officer*   *Commissioner of Patents and Trademarks*